United States Patent
Wu

(10) Patent No.: US 9,752,426 B2
(45) Date of Patent: Sep. 5, 2017

(54) WELL RANGING APPARATUS, SYSTEMS, AND METHODS

(71) Applicant: Halliburton Energy Services, Inc., Houston, TX (US)

(72) Inventor: Hsu-Hsiang Wu, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/769,476

(22) PCT Filed: Aug. 4, 2015

(86) PCT No.: PCT/US2015/043557
§ 371 (c)(1),
(2) Date: Aug. 21, 2015

(87) PCT Pub. No.: WO2016/025230
PCT Pub. Date: Feb. 18, 2016

(65) Prior Publication Data
US 2016/0273338 A1 Sep. 22, 2016

Related U.S. Application Data

(60) Provisional application No. 62/035,877, filed on Aug. 11, 2014, provisional application No. 62/037,440, (Continued)

(51) Int. Cl.
*G01V 3/18* (2006.01)
*G01V 3/00* (2006.01)
(Continued)

(52) U.S. Cl.
CPC .......... *E21B 47/02216* (2013.01); *E21B 7/04* (2013.01); *E21B 33/14* (2013.01);
(Continued)

(58) Field of Classification Search
CPC ........................................................ G01V 3/26
(Continued)

(56) References Cited

U.S. PATENT DOCUMENTS

| 4,372,398 A | 2/1983 | Kuckes |
| 4,443,762 A | 4/1984 | Kuckes |

(Continued)

FOREIGN PATENT DOCUMENTS

| WO | WO-2007/015087 A1 | 2/2007 |
| WO | WO-2012/134468 A1 | 10/2012 |

(Continued)

OTHER PUBLICATIONS

"U.S. Appl. No. 14/769,539, Non Final Office Action mailed Aug. 5, 2016", 32 pgs.

(Continued)

*Primary Examiner* — Bot Ledynh
(74) *Attorney, Agent, or Firm* — Gilliam IP PLLC

(57) ABSTRACT

Disclosed embodiments include well ranging apparatus, systems, and methods which operate to receive normal components of electromagnetic field strength azimuthal measurements within a first well at different tool azimuth angles in the first well. Further activities include determining an approximate range from the sensors to a second well that serves as a source of an electromagnetic field, via direct transmission or backscatter transmission, using the normal components of the electromagnetic field strength azimuthal measurements. In some embodiments, the approximate range can be determined without introducing sensor azimuthal separation into range calculations. Additional apparatus, systems, and methods are disclosed.

15 Claims, 11 Drawing Sheets

Related U.S. Application Data filed on Aug. 14, 2014, provisional application No. 62/078,732, filed on Nov. 12, 2014.

(51) Int. Cl.

| | |
|---|---|
| *G01V 3/10* | (2006.01) |
| *G01V 3/26* | (2006.01) |
| *E21B 47/022* | (2012.01) |
| *E21B 7/04* | (2006.01) |
| *E21B 33/14* | (2006.01) |
| *E21B 47/024* | (2006.01) |
| *G01V 99/00* | (2009.01) |
| *G06F 17/11* | (2006.01) |
| *E21B 43/24* | (2006.01) |
| *E21B 47/12* | (2012.01) |
| *E21B 47/18* | (2012.01) |

(52) U.S. Cl.
CPC .............. *E21B 47/024* (2013.01); *G01V 3/26* (2013.01); *G01V 99/005* (2013.01); *G06F 17/11* (2013.01); *E21B 43/2406* (2013.01); *E21B 47/12* (2013.01); *E21B 47/122* (2013.01); *E21B 47/18* (2013.01)

(58) Field of Classification Search
USPC ........................................................ 324/346
See application file for complete search history.

(56) References Cited

U.S. PATENT DOCUMENTS

| | | | |
|---|---|---|---|
| 5,189,415 A | 2/1993 | Shimada et al. | |
| 5,230,387 A | 7/1993 | Waters et al. | |
| 5,305,212 A | 4/1994 | Kuckes | |
| 5,512,830 A | 4/1996 | Kuckes | |
| 5,582,248 A | 12/1996 | Estes | |
| 5,589,775 A | 12/1996 | Kuckes | |
| 6,179,066 B1 | 1/2001 | Nasr et al. | |
| 6,525,540 B1 | 2/2003 | Kong et al. | |
| 6,985,814 B2 | 1/2006 | Mcelhinney | |
| 7,268,552 B1 | 9/2007 | Gerald, II et al. | |
| 7,703,548 B2 | 4/2010 | Clark | |
| 7,719,282 B2 | 5/2010 | Fanini et al. | |
| 7,962,287 B2 | 6/2011 | Clark | |
| 8,011,451 B2 | 9/2011 | MacDonald | |
| 8,126,650 B2 | 2/2012 | Lu et al. | |
| 8,237,443 B2 | 8/2012 | Hopmann et al. | |
| 8,324,912 B2 | 12/2012 | Waid et al. | |
| 8,680,866 B2 | 3/2014 | Marsala et al. | |
| 8,749,243 B2 | 6/2014 | Bittar et al. | |
| 8,844,648 B2 | 9/2014 | Bittar et al. | |
| 2002/0000808 A1 | 1/2002 | Nichols | |
| 2003/0137297 A1* | 7/2003 | Ganesan | ........................ 324/303 |
| 2006/0131013 A1 | 6/2006 | Mcelhinney | |
| 2008/0177475 A1 | 7/2008 | Mcelhinney et al. | |
| 2008/0275648 A1 | 11/2008 | Illfelder | |
| 2009/0164127 A1 | 6/2009 | Clark | |
| 2009/0260878 A1 | 10/2009 | Morley et al. | |
| 2009/0308657 A1* | 12/2009 | Clark et al. | ........................ 175/45 |
| 2010/0194395 A1 | 8/2010 | Mcelhinney | |
| 2010/0300756 A1 | 12/2010 | Bergstrom et al. | |
| 2011/0018542 A1 | 1/2011 | Clark et al. | |
| 2011/0284731 A1 | 11/2011 | Roscoe et al. | |
| 2011/0290011 A1 | 12/2011 | Dowla et al. | |
| 2011/0309836 A1 | 12/2011 | Bittar et al. | |
| 2012/0013339 A1 | 1/2012 | Kuckes et al. | |
| 2012/0109527 A1 | 5/2012 | Bespalov et al. | |
| 2012/0139543 A1 | 6/2012 | McElhinney et al. | |
| 2012/0158305 A1 | 6/2012 | Rodney et al. | |
| 2012/0257475 A1 | 10/2012 | Luscombe et al. | |
| 2012/0283952 A1 | 11/2012 | Tang et al. | |
| 2013/0056272 A1 | 3/2013 | Kuckes | |
| 2013/0068526 A1 | 3/2013 | Snyder et al. | |
| 2013/0151158 A1 | 6/2013 | Brooks et al. | |
| 2013/0173164 A1 | 7/2013 | Zhang | |
| 2013/0333946 A1 | 12/2013 | Sugiura | |
| 2014/0191120 A1 | 7/2014 | Donderici et al. | |
| 2015/0378044 A1 | 12/2015 | Brooks | |
| 2016/0258275 A1 | 9/2016 | Wu et al. | |
| 2016/0273339 A1 | 9/2016 | Wu | |
| 2016/0273340 A1 | 9/2016 | Roberson et al. | |
| 2016/0273341 A1 | 9/2016 | Wu et al. | |
| 2016/0273342 A1 | 9/2016 | Wu et al. | |
| 2016/0273343 A1 | 9/2016 | Donderici et al. | |
| 2016/0273344 A1 | 9/2016 | Wu et al. | |

FOREIGN PATENT DOCUMENTS

| | | |
|---|---|---|
| WO | WO-2013/162505 A1 | 10/2013 |
| WO | WO-2014/089402 A2 | 6/2014 |
| WO | WO-2016025230 A1 | 2/2016 |
| WO | WO-2016025235 A1 | 2/2016 |
| WO | WO-2016025237 A1 | 2/2016 |
| WO | WO-2016025238 A1 | 2/2016 |
| WO | WO-2016025241 A1 | 2/2016 |
| WO | WO-2016025245 A1 | 2/2016 |
| WO | WO-2016025247 A1 | 2/2016 |

OTHER PUBLICATIONS

Van Dongen, Koen W. A., "A Directional Borehole Radar System for Subsurface Imaging", DUP Science, (2002), 111 pgs.

* cited by examiner

WELL RANGING APPARATUS, SYSTEMS, AND METHODS

CROSS-REFERENCE TO RELATED APPLICATIONS

The present application is a U.S. National Stage Filing under 35U.S.C. 371from International Application No. PCT/US2015/043557, filed on 4 Aug. 2015, which application claims the benefit of priority to provisional application Ser. No. 62/035,877, filed Aug. 11, 2014; provisional application Ser. No. 62/037,440, filed Aug. 14, 2014; and provisional application Ser. No. 62/078,732, filed Nov. 12, 2014; each of which is incorporated herein by reference in its entirely.

BACKGROUND

With much of the world's easily obtainable oil having already been produced, new techniques are being developed to extract less accessible hydrocarbons. These techniques often involve drilling a borehole in close proximity to one or more existing wells. Examples of directed drilling near an existing well include well intersection for blowout control, multiple wells drilled from an offshore platform, and closely spaced wells for geothermal energy recovery. Another such technique is steam-assisted gravity drainage (SAGD) that uses a pair of vertically-spaced, horizontal wells constructed along a substantially parallel path, often less than ten meters apart. Careful control of the spacing contributes to the effectiveness of the SAGD technique.

One way to construct a borehole in close proximity to an existing well is "active ranging" or "access-dependent ranging" in which an electromagnetic source is located in the existing well and monitored via sensors on the drill string in the well under construction. Another technique involves systems that locate both the source and the sensor(s) on the drill string—relying on backscatter transmission from the target well to determine the range between the drilling well and the target well. These latter systems are sometimes called "passive ranging" or "access-independent" systems by those of ordinary skill in the art. In either case, the ranging techniques are sometimes limited in the degree of accuracy that can be obtained.

DETAILED DESCRIPTION

Introduction

Magnetic ranging has been widely used for various applications, including well intersection, well avoidance, SAGD, and others. One excitation method for magnetic ranging is surface excitation. Surface excitation is a popular method of generating a ranging signal. It is relatively easy to implement, without the need for complex cabling and equipment. When surface excitation is used, a current is injected into a target well casing at the surface of the well (e.g., at the well head). The current travels along the casing down-hole and generates a magnetic field down-hole that originates from the target via direct transmission, and can be measured at a distance (e.g., in a drilling well) for ranging purposes. As a result, the excitation signal down-hole may be relatively weak when the distance beneath the surface is great, due to the current leakage into the conductive formation. Consequently, sensor noise often affects magnetic ranging accuracy at greater depths, leading to false signal measurements and failures in well location. Some of the embodiments described herein are designed to improve down-hole current strength and/or enhance the signal/noise ratio, for improved accuracy with respect to ranging measurement technology.

Such apparatus, methods, and systems can be even more useful when backscatter ranging is used: that is, when the excitation source is injected into the casing of the drilling well, or is attached to a drill string within the drilling well. In the case of backscatter ranging, the excitation source originates a direct transmission signal that impinges upon, and is then reflected from, the target well. When these backscatter transmission signals are received at a receiver in the drilling well, the resulting received ranging signals are even weaker than in the direct transmission case.

Thus, novel apparatus, methods, and systems are proposed to increase the strength of the received ranging signal, to improve the received signal-to-noise ratio (SNR), and to improve the accuracy of ranging signal measurements. In some embodiments, enhancements are realized in all three of these areas. By taking this approach, ranging system technology can be improved in a number of ways, via improved accuracy and reliability of individual ranging measurements. Therefore, the apparatus, methods, and systems proposed herein can be used to reduce measurement issues that arise due to noise, as well as to generate larger signals at great depths. The result is that the maximum detection ranges for existing ranging systems can be significantly improved. In some embodiments, the apparatus, methods, and systems described herein can be applied to electromagnetic (EM) telemetry applications.

Figure 1:
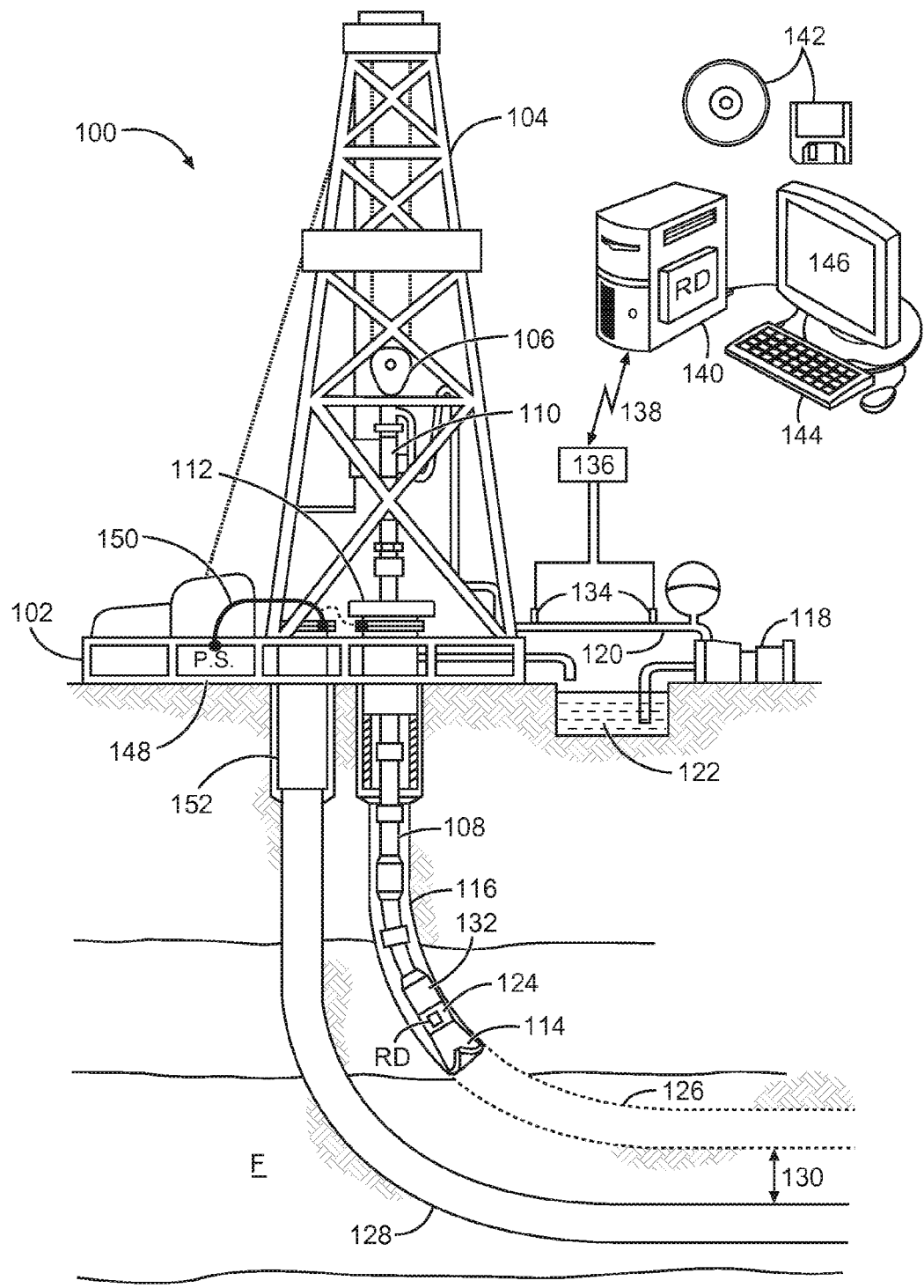
FIG. 1 depicts an example drilling environment in which ranging embodiments may be employed.

FIG. 1 depicts an example drilling environment 100 in which ranging embodiments may be employed. The disclosed apparatus (e.g., logging tools), systems, and methods are best understood in the context of the larger systems in which they operate. Accordingly, FIG. 1 illustrates an example drilling environment 100 in which a drilling platform 102 supports a derrick 104 having a traveling block 106 for raising and lowering a drill string 108. A top drive 110 supports and rotates the drill string 108 as it is lowered through the well-head 112. A drill bit 114 is driven by a downhole motor and/or rotation of the drill string 108. As the drill bit 114 rotates, it creates a borehole 116 that passes through various formations F. A pump 118 circulates drilling fluid through a feed pipe 120 to top drive 110, downhole through the interior of drill string 108, through orifices in drill bit 114, back to the surface via the annulus around drill string 108, and into a retention pit 122. The drilling fluid transports cuttings from the borehole into the retention pit 122 and aids in maintaining the borehole integrity.

The drill bit 114 is just one piece of a bottom-hole assembly that includes one or more drill collars (comprising thick-walled steel pipe) to provide weight and rigidity to aid the drilling process. Some of these drill collars include logging instruments to gather measurements of various drilling parameters such as position, orientation, weight-on-bit, borehole diameter, etc. The tool orientation may be specified in terms of a tool face angle (also known as rotational or azimuthal orientation), an inclination angle (the slope), and a compass direction, each of which can be derived from measurements made by magnetometers, inclinometers, and/or accelerometers, though other sensor types such as gyroscopes may also be used. In one specific embodiment, the tool includes a three-axis fluxgate magnetometer and a three-axis accelerometer. As is known in the art, the combination of these two sensor systems enables the measurement of the tool face angle, inclination angle, and compass direction. In some embodiments, the tool face and hole inclination angles are calculated from the accelerometer sensor output, and the magnetometer sensor outputs are used to calculate the compass direction.

The bottom-hole assembly further includes a ranging tool 124 to receive signals from current injected by a power supply 148 into nearby conductors such as pipes, casing strings, and conductive formations and to collect measurements of the resulting field to determine distance and direction. Using measurements of these signals, in combination with the tool orientation measurements, the driller can, for example, steer the drill bit 114 along a desired path in the drilling well 126 relative to the existing well (e.g., target well) 128 in formation F using any one of various suitable directional drilling systems, including steering vanes, a "bent sub", and a rotary steerable system. For precision steering, the steering vanes may be the most useful steering mechanism. The steering mechanism can be controlled from the Earth's surface, or downhole, with a downhole controller programmed to follow the existing borehole 128 at a predetermined distance 130 and position (e.g., directly above or below the existing borehole).

The ranging tool 124 may comprise one or more elements, interchangeably designated as receivers or sensors in this document. These elements may comprise uniaxial, biaxial, or triaxial magnetometers, coil antennas, and/or telemetry receivers.

A telemetry sub 132 coupled to the downhole tools (including ranging tool 124) transmits telemetry data to the surface via mud pulse telemetry. A transmitter in the telemetry sub 132 modulates a resistance to drilling fluid flow to generate pressure pulses that propagate along the fluid stream at the speed of sound to the surface. One or more pressure transducers 134 convert the pressure signal into electrical signal(s) for a signal digitizer 136. Note that other forms of telemetry exist and may be used to communicate signals from downhole to the digitizer. Such telemetry may include acoustic telemetry, electromagnetic telemetry, or telemetry via wired drill pipe.

The digitizer 136 supplies a digital form of the telemetry signals via a communications link 138 to a computer 140 or some other form of a data processing device. The computer 140 operates in accordance with software (which may be stored on non-transitory information storage media 142) and user input provided via an input device 144 to process and decode the received signals. The resulting telemetry data may be further analyzed and processed by the computer 140 to generate a display of useful information on a computer monitor 146 or some other form of a display device. For example, a driller could employ this system to obtain and monitor drilling parameters, formation properties, and the path of the borehole relative to the existing borehole 128 and any detected formation boundaries. A downlink channel can then be used to transmit steering commands from the surface to the bottom-hole assembly. In some embodiments, the computer 140 has analog circuitry installed or is programmed to include a ranging determination module RD, which operates on the signal data received down hole at the ranging tool 124 to determine the distance and direction from the drilling well 126 to the target well 128. The ranging determination module RD may exist in the computer 140 or the tool 124, and may be used to implement any of the methods described herein.

Thus, FIG. 1 illustrates an electromagnetic ranging system with surface excitation. The power supply 148 at the surface employs a cable 150 to inject current into target well casing 152 and flowing down-hole so that magnetic fields can be generated surrounding a target well 128. Then sensors in the ranging tool 124 in the drilling well 126 can determine the magnetic field strength in various directions so that distance and direction between the target well 128 and drilling well 126 can be determined. The power supply 148 can also be connected to inject current into the casing of the drilling well 126.

The drilling well 126 and the target well 128 are often constructed as a cased hole, with cement installed around the outside of the casing material (e.g., conductive piping). In the completion phase of oil and gas wells, the cement serves to isolate the wellbore, helps prevent casing failure, and keeps the wellbore fluids from contaminating freshwater aquifers.

DETAILED PRESENTATION

For a two-sensor configuration, in the same azimuthal plane, the insert current is an example of a bottom hole assembly (BHA), or BHA insert, conductive current that distorts the ranging current measurement between a target well and a drilling well. The insert current can flow from the drilling collar to the insert, so that it exists inside the measurement radius of the sensors. Any similar current that flows within the sensor radius can distort the ranging measurement. For example, these distorting currents can flow through other components down hole, such as drilling mud.

To solve this technical problem, the normal field ranging calculation can be determined in a way that operates to reduce insert current measurement distortion at the sensors. In some embodiments, field strength measurements from two or more sensors separated from each other are made. Ranging calculations are implemented using the normal field components of the electromagnetic field strength measurements, to avoid the effects of external noise from insert current near the sensors, including leakage current effects.

Figure 2:
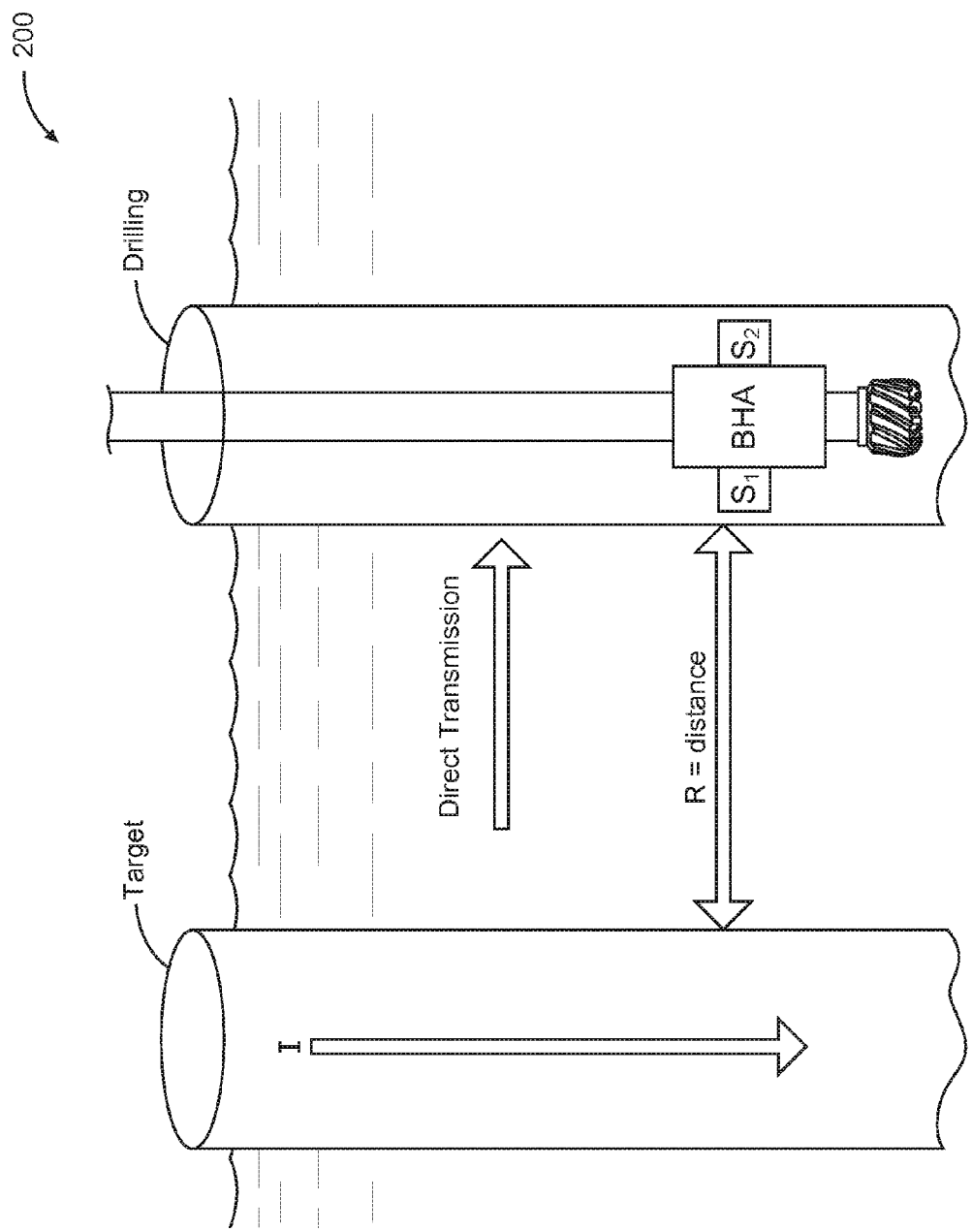
FIG. 2 is a block diagram of a well ranging system, for various embodiments.
Figure 3:
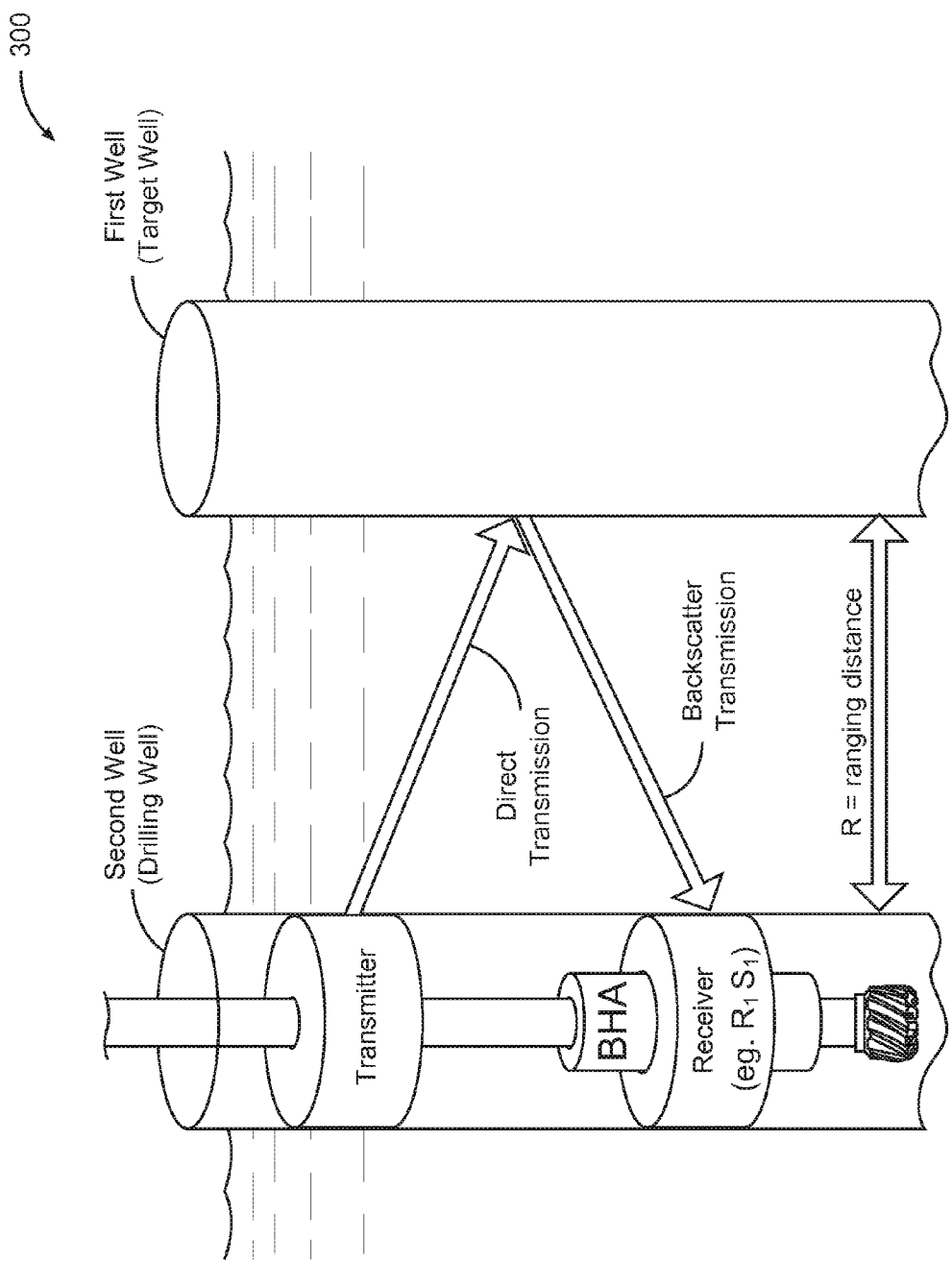
FIG. 3 is a block diagram of a well ranging system, for various embodiments.
Figure 4:
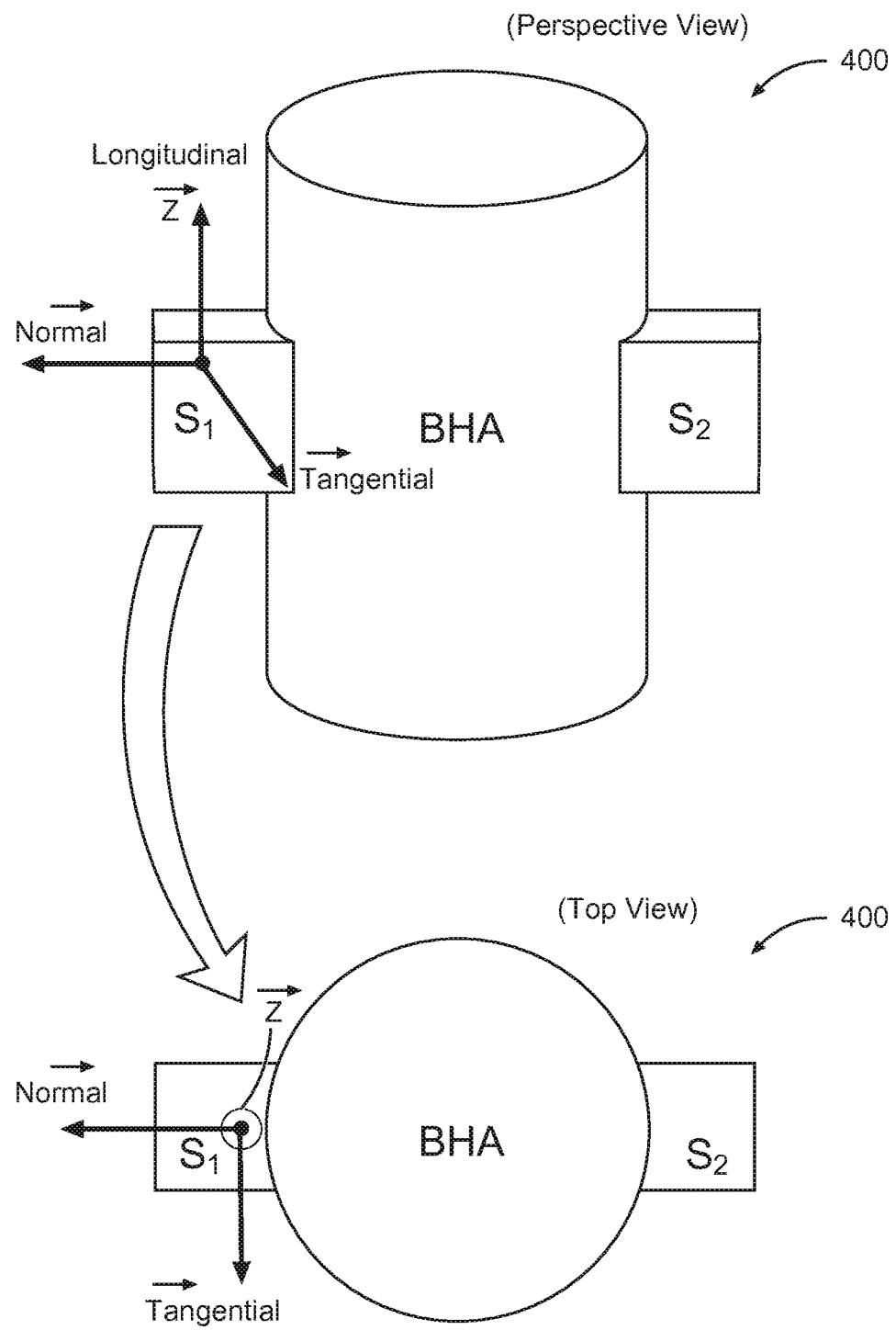
FIG. 4 is a block diagram of a well ranging apparatus 400, in perspective and top views, for various embodiments.

FIG. 2 is a block diagram of a well ranging system 200, for various embodiments. FIG. 3 is a block diagram of a well ranging system 300, for various embodiments. FIG. 4 is a block diagram of a well ranging apparatus 400, in perspective and top views, for various embodiments.

Referring now to FIGS. 2 (illustrating access-dependent ranging), 3 (illustrating access-independent ranging), and 4 (illustrating a housing with attached sensors, such as a ranging tool housing), it can be seen that in some well ranging applications, excitation current I is injected into a target well, while sensors S1, S2 to receive the injected current are located in a drilling well, often attached to a BHA. The sensors S1, S2 may operate to receive and measure the strength of an electromagnetic field that results from direct transmission, or from backscatter transmission. In either case, the sensors S1, S2 are utilized to detect the signals originating from the target well and thereafter determine relative ranging distance R and direction between the target well and the drilling well.

The measurements of field strength may have several components: an overall magnitude value at the sensor, and/or individual vector components, designated as the normal N, tangential T, and longitudinal z components.

Figure 5:
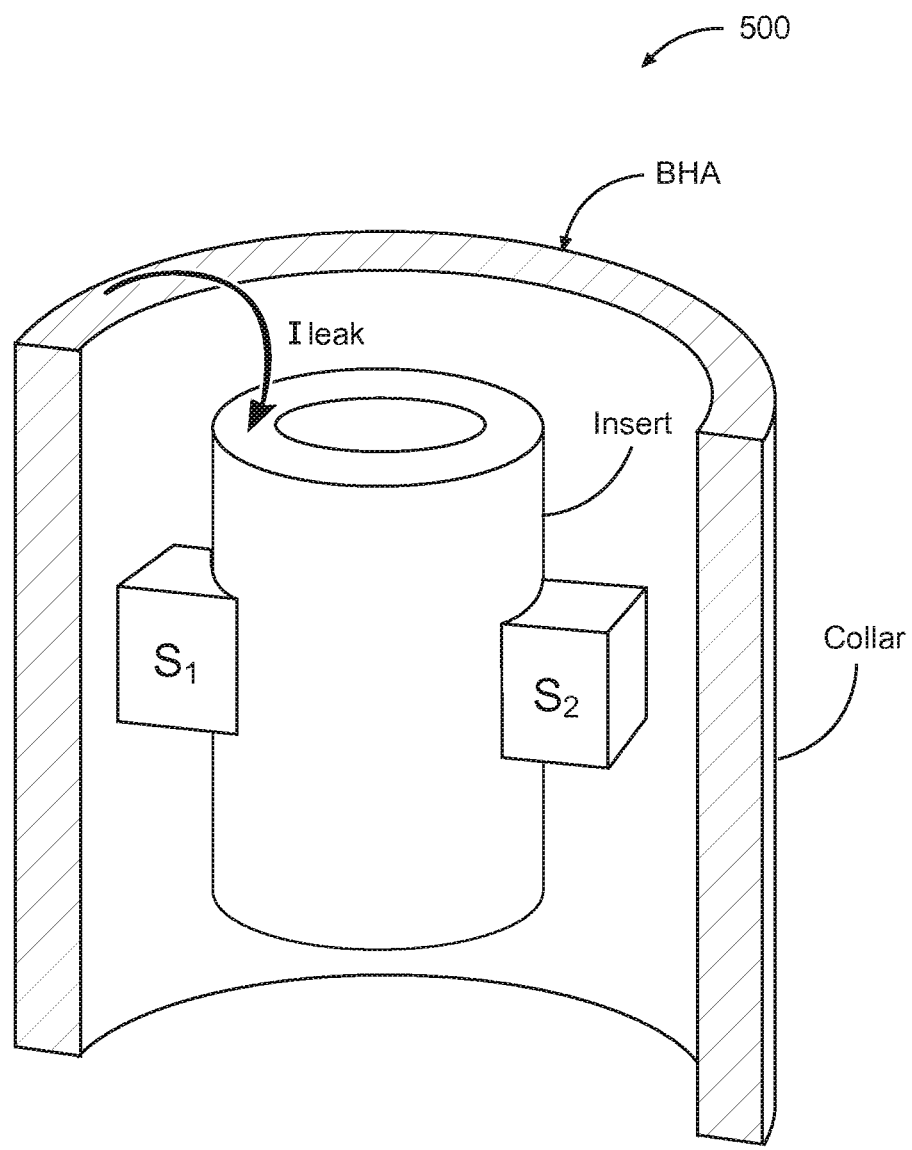
FIG. 5 is a block diagram of a well ranging apparatus, for various embodiments.

FIG. 5 is a block diagram of a well ranging apparatus 500, for various embodiments. Here a housing (e.g., drill collar) with sensors S1, S2 attached to an insert, such as a ranging tool housing, is shown. It has been determined that some of the surface excitation current I will flow from the target well into the drilling well itself, causing leakage current in the insert of the BHA. This leakage current $I_{leak}$ will introduce an additional signal to the sensors S1, S2, disturbing the sensor measurements and affecting the accuracy of ranging performance. To solve this problem, methods for processing the normal component of magnetic field measurements are described herein, along with corresponding tool configurations—which can be used together to determine the relative distance or range between the tool center and a target line source.

It is believed that the effect of leakage currents on the normal magnetic field strength vector component is negligible in many embodiments. Thus, calculating the range between the wells based on the normal component should be more accurate than other component measured by the sensor.

Ranging Determination Based on an Infinite Line Source

Figure 6:
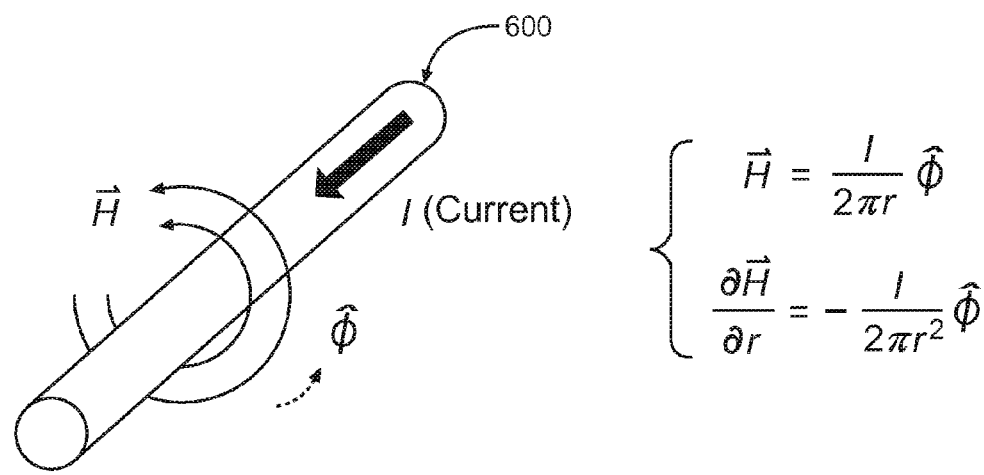
FIGS. 6 to 11 illustrate a variety of apparatus, methods, and system configurations for various range determination embodiments.

FIGS. 6 to 11 illustrate a variety of apparatus, methods, and system configurations for various range determination embodiments. In FIG. 6, an infinite line source 600 with a constant current I, is shown. Based on Ampere's law, the magnetic field H at low frequency surrounding the line source 600 is expressed as $$\vec{H} = \frac{I}{2\pi r}\vec{\Phi}, \tag{1}$$

where r is the distance between an observation point and the infinite line source. In addition, the gradient field can be given by:

$$\frac{\partial \vec{H}}{\partial r} = -\frac{I}{2\pi r^2}\vec{\Phi}. \tag{2}$$

Consequently, the distance r can be directly computed by taking ratio of the amplitude of Equation (1) to the amplitude of Equation (2), given by:

$$\left|\frac{\vec{H}}{\frac{\partial \vec{H}}{\partial r}}\right| = \left|\frac{\frac{I}{2\pi r}}{\frac{-I}{2\pi r^2}}\right| = r. \tag{3}$$

Figure 7:
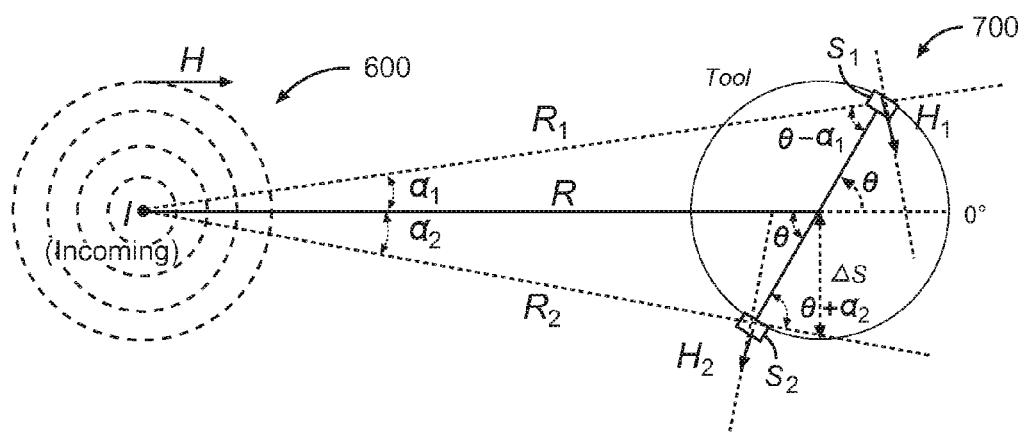
Figure 8:
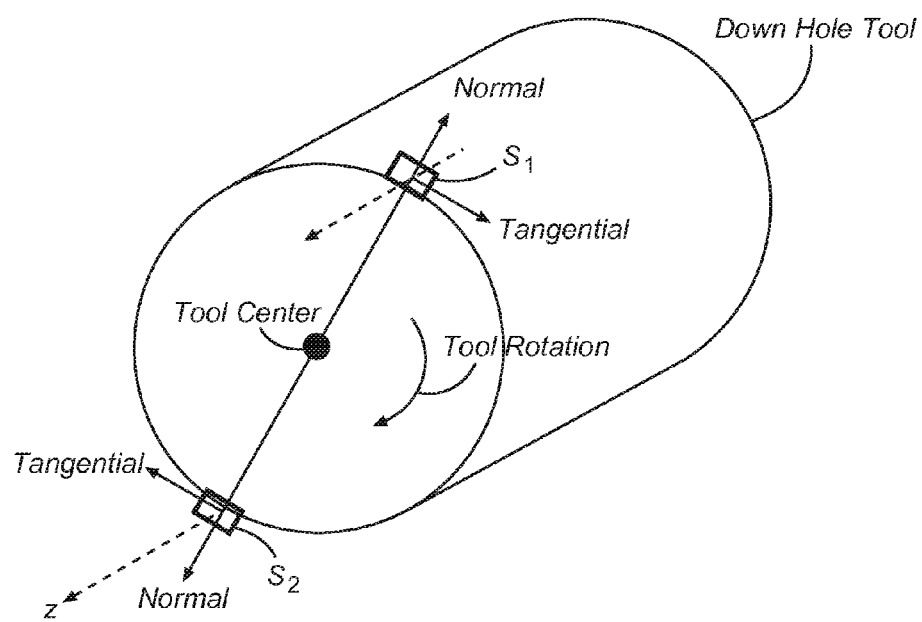

In FIG. 7, a block diagram of an infinite line source 600 and a logging tool 700 equipped with two sensors S1, S2 for gradient field determination can be seen. Equation (3) can be designated as the gradient method used to compute a ranging distance between wells. In practice, two sensors (e.g., magnetometers) S1, S2 are used to compute magnetic field and gradient field measurements as shown in FIG. 7. A finite difference method is then utilized to calculate the magnetic field strength H and the gradient field strength, given by $$\vec{H} = \frac{\vec{H}_1 + \vec{H}_2}{2}, \text{ and} \tag{4a}$$

$$\frac{\partial \vec{H}}{\partial r} = \frac{\vec{H}_1 - \vec{H}_2}{2\Delta S}, \tag{4b}$$

where $H_1$ and $H_2$ are the total field measurements at sensor S1 and sensor S2, respectively. $\Delta S$ is the separation between each sensor and the tool center. Consequently, Equation (3) is modified based on the finite difference method to compute the ranging distance r, as follows:

$$r = \left|\frac{\frac{\vec{H}_1 + \vec{H}_2}{2}}{\frac{\vec{H}_1 - \vec{H}_2}{2\Delta S}}\right|. \tag{5}$$

In practice, each sensor measures three orthogonal field components to acquire total field measurement. The three orthogonal field components are: the normal component N, the tangential component T, and the z component shown in FIG. 8. In the figure, the normal component N and the tangential component T are in the same plane as the down hole tool (e.g., logging tool) azimuthal plane. The direction of the tangential component T is the same as the tool rotation direction, whereas the normal component N direction is perpendicular to the tool rotation direction and points away from the tool center. Thus, the normal component N lies on a straight line between the tool center and the location of the sensors S1, S2. The z component direction is parallel to the tool mandrel along with the BHA (i.e., parallel to the tool longitudinal axis).

Thus, the total field ($H_1$ or $H_2$ in FIG. 7) can be determined by Equation (6) as:

$$\text{Total Field } \vec{H} = \vec{H}_Z + \vec{H}_{Tangential} + \vec{H}_{Normal}. \tag{6}$$

The amplitude of total field can be calculated by Equation (7) as:

$$|\vec{H}| = \sqrt{|\vec{H}_Z|^2 + |\vec{H}_{Tangential}|^2 + |\vec{H}_{Normal}|^2}. \tag{7}$$

Leakage Current

Figure 9:
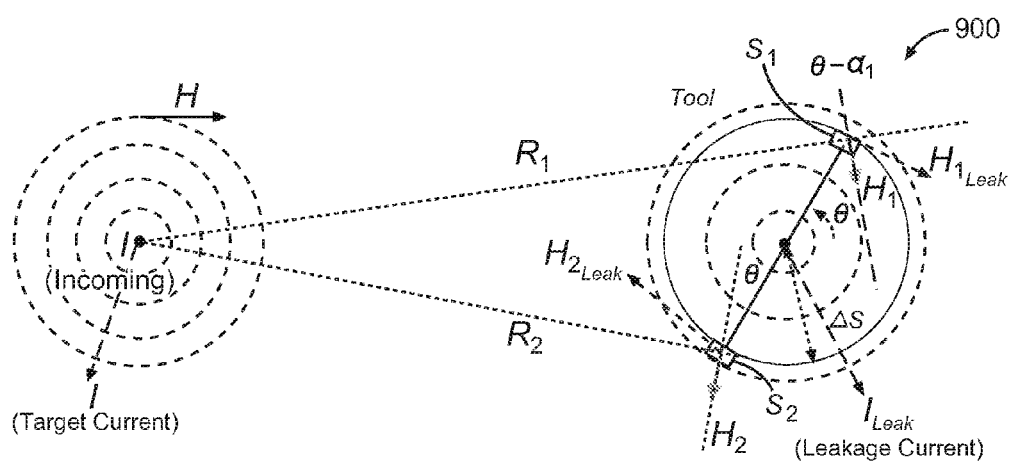

Leakage current $I_{leak}$ appears as an additional current source flowing at the tool center between the two sensors S1, S2 as shown in FIG. 9, which is a top view of two line sources: one is a target current I and the other is leakage current $I_{leak}$. In addition, a logging tool 900 attached to two sensors S1, S2 for gradient field determination are shown.

Assuming the leakage current $I_{leak}$ flows uniformly at the tool center, an additional tangential field component $H_{1Leak}$ and $H_{2Leak}$ will be determined at the sensors S1, S2, respectively. Consequently, the leakage current $I_{leak}$ will generate signals of significant strength, disturbing the ranging calculation based on sensor measurements that take into account the total field strength, or the tangential component of that field strength. On the other hand, the normal component of sensor measurements is relatively unaffected by the leakage current $I_{leak}$, due to the field component direction being at a perpendicular orientation from the field pattern of the leakage current $I_{leak}$. Thus, ranging determinations based primarily or exclusively on the normal component should have higher ranging accuracy compared with calculations using other field components (e.g., the tangential or total field measurements).

Processing Methods Based on Normal Component Measurements

Figure 10:
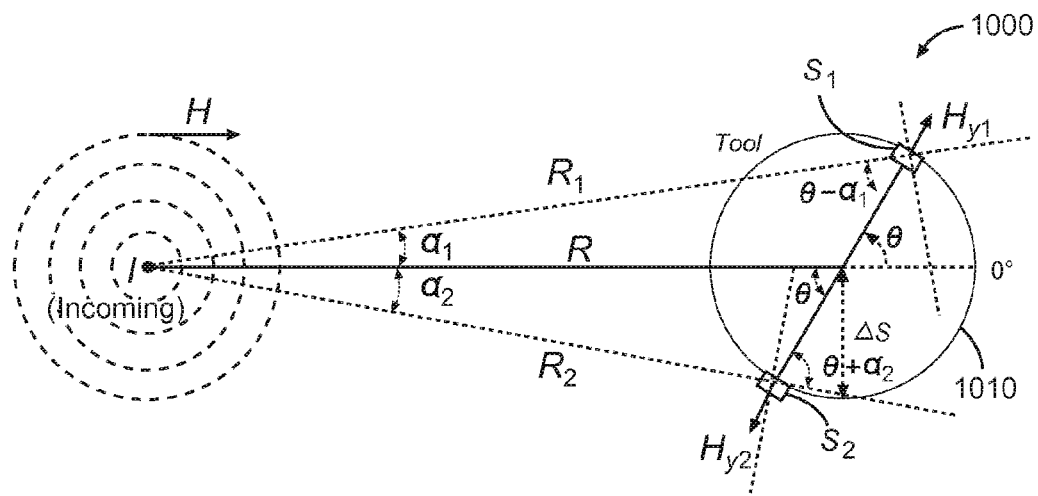

FIG. 10 illustrates a top view of an infinite line source and a logging tool 1000 equipped with two sensors S1, S2 for normal field determination for various range determination embodiments. For simplicity, the two sensors S1, S2 are shown as being oriented 180° away from each other on each side of a logging tool housing 1010. These sensors S1, S2 are utilized to determine the ranging distance R. $\Delta S$ indicates the separation between one of the sensors and the tool center, and in this example the sensors are separated by a distance of $2\Delta S$. $H_{y1}$ and $H_{y2}$ are the normal component measurements received at sensors S1 and S2, respectively. $H_{y1}$ and $H_{y2}$ can thus be expressed as:

$$H_{y1} = -H_1 \sin(\theta - \alpha_1) = \frac{-I}{2\pi R_1}(\sin\theta\cos\alpha_1 - \cos\theta\sin\alpha_1) = \frac{-I}{2\pi R_1^2}(R\sin\theta) \quad (8a)$$

and $$H_{y2} = H_2 \sin(\theta - \alpha_2) = \frac{I}{2\pi R_2}(\sin\theta\cos\alpha_2 + \cos\theta\sin\alpha_2) = \frac{I}{2\pi R_2^2}(R\sin\theta) \quad (8b)$$

Based on the finite difference method, the total field is given by Equation (9), and the gradient field by Equation (10), as follows:

$$H = \frac{H_{y1} - H_{y2}}{2} = \frac{-I}{2\pi R_1^2}(R\sin\theta) - \frac{I}{2\pi R_2^2}(R\sin\theta) = -\frac{2IR\sin\theta}{4\pi R_1^2 R_2^2}(R^2 + \Delta S^2), \quad (9)$$

and $$\frac{\Delta H}{2\Delta S} = \frac{H_{y1} + H_{y2}}{2\Delta S} = \frac{-I}{4\Delta S\pi R_1^2}(R\sin\theta) + \frac{I}{4\Delta S\pi R_2^2}(R\sin\theta) = \frac{2IR\sin\theta}{4\pi R_1^2 R_2^2}(2R\cos\theta) \quad (10)$$

Taking ratio of Equation (9) to Equation (10) provides Equation (11):

$$\frac{H}{\frac{\Delta H}{2\Delta S}} = -\frac{R^2 + \Delta S^2}{2R\cos\theta} = -\frac{R}{2\cos\theta}\left(1 + \left(\frac{\Delta S}{R}\right)^2\right). \quad (11)$$

From Equation (11) the ranging distance R can be calculated based on the normal component measurements of H and $\Delta H$, the ranging angle $\theta$, and the known sensor separation $\Delta S$ from the tool center. However, the tangential and normal components are usually used to calculate the ranging angle $\theta$.

Figure 11:
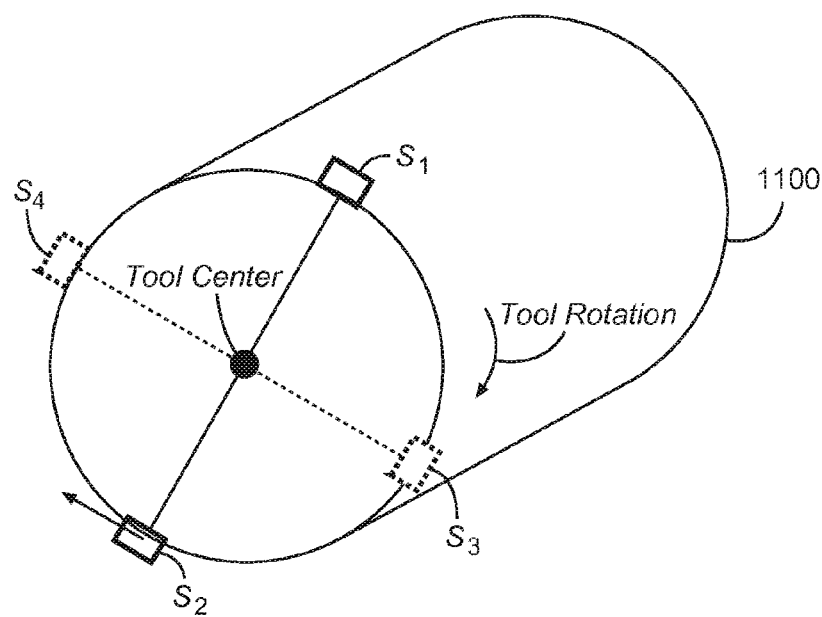

FIG. 11 provides a perspective view of two pairs of gradient sensors (S1, S2) and (S3, S4) attached to a housing 1100, such as a down hole tool. The a second pair of gradient sensors (sensors S3 and S4) is utilized to make additional measurements to avoid determining the ranging angle $\theta$ based on values of the tangential and normal components, according to Equation (12):

$$\frac{H}{\frac{\Delta H}{2\Delta S_{Pair2}}} = \frac{R}{2\sin\theta}\left(1 + \left(\frac{\Delta S}{R}\right)^2\right). \quad (12)$$

Consequently, the ranging angle $\theta$ can be obtained by taking ratio between Equation (11) and Equation (12), and thereafter the ranging distance R can be calculated from either Equation (11) or Equation (12) when the ranging angle $\theta$ has been determined. However, in some embodiments, the ranging distance R can be calculated without knowing the ranging angle $\theta$, based on Equation (13).

$$\sqrt{\frac{1}{\left(\frac{\Delta H}{2\Delta S}\right)^2_{Pair1} + \left(\frac{\Delta H}{2\Delta S}\right)^2_{Pair2}}} = \quad (13)$$

$$\sqrt{\frac{1}{\frac{4\cos^2\theta}{R^2} + \frac{4\sin^2\theta}{R^2}}}\left(1 + \left(\frac{\Delta S}{R}\right)^2\right) = \frac{R}{2}\left(1 + \left(\frac{\Delta S}{R}\right)^2\right)$$

In some embodiments, the abbreviated expression shown in Equation (14) may be useful to determine the ranging distance R, while improving the operation of field computers. Its use is appropriate when the value of $$\frac{\Delta S}{R}$$

is less than one, which is often the case in the field.

$$\sqrt{\frac{1}{\left(\frac{\Delta H}{2\Delta S}\right)^2_{Pair1} + \left(\frac{\Delta H}{2\Delta S}\right)^2_{Pair2}}} = \frac{R}{2}\left(1 + \left(\frac{\Delta S}{R}\right)^2\right) \approx \frac{R}{2} \quad (14)$$

Figure 12:
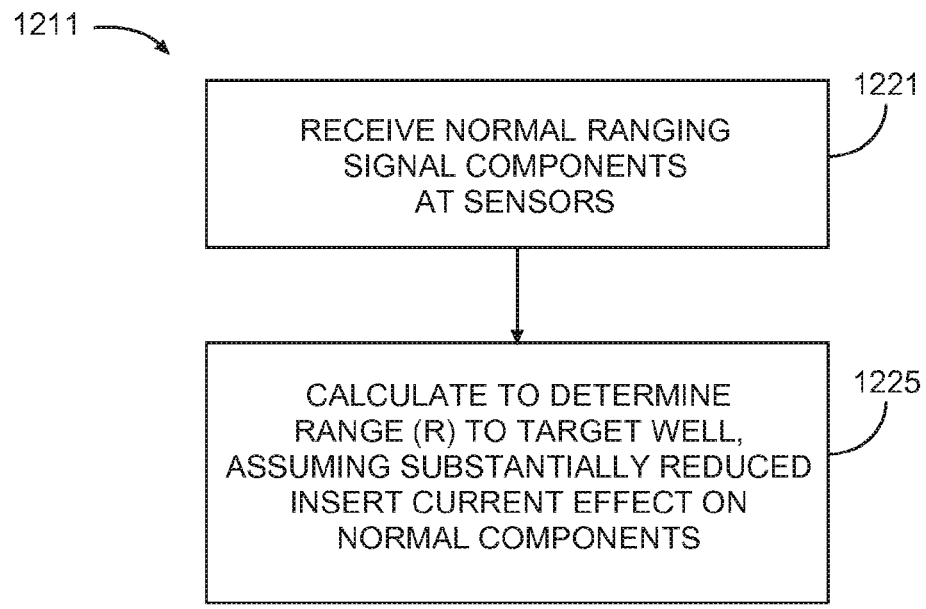
FIG. 12 is a flow diagram of a well ranging method, for various embodiments.

FIG. 12 is a flow diagram of a well ranging method 1211, for various embodiments. In this flow diagram of a method 1211 for range determination, the normal components of ranging signals can be received at block 1221, and then at block 1225, a calculation to determine the range R to the target well, assuming substantially reduced insert current effects on the normal components, can be made. For example, Equation (14) utilizes only the normal component N measurements of the sensors S1, S2, S3, and S4 shown in FIG. 11 to determine the ranging distance R. This distance can thus be determined in the presence of leakage current $I_{leak}$, to improve the accuracy of ranging determinations.

Indeed, in some embodiments, the second pair of gradient sensors (sensor S3 and S4) attached to the housing 1100 (e.g., logging tool) of FIG. 11 is not physically present. Instead, Equation (13) and Equation (14) can be used during logging while drilling (LWD) service, for example, by simply making a first set of measurements using sensors S1 and S2 at a given tool azimuth angle (while the tool is stationary or moving), and then rotating the tool 90 degrees in the azimuthal direction, so that a second set of measurements can be made with sensors S1 and S2 (i.e., now rotated to be in the locations of sensors S3, S4, respectively). Again, the tool may be stationary or moving when the second set of measurements is made. The two sets of measurements taken at two different tool azimuth angles that are separated by approximately 90 degrees can thus also be used to calculate the ranging distance R, using either of Equations (13) or (14).

Figure 13:
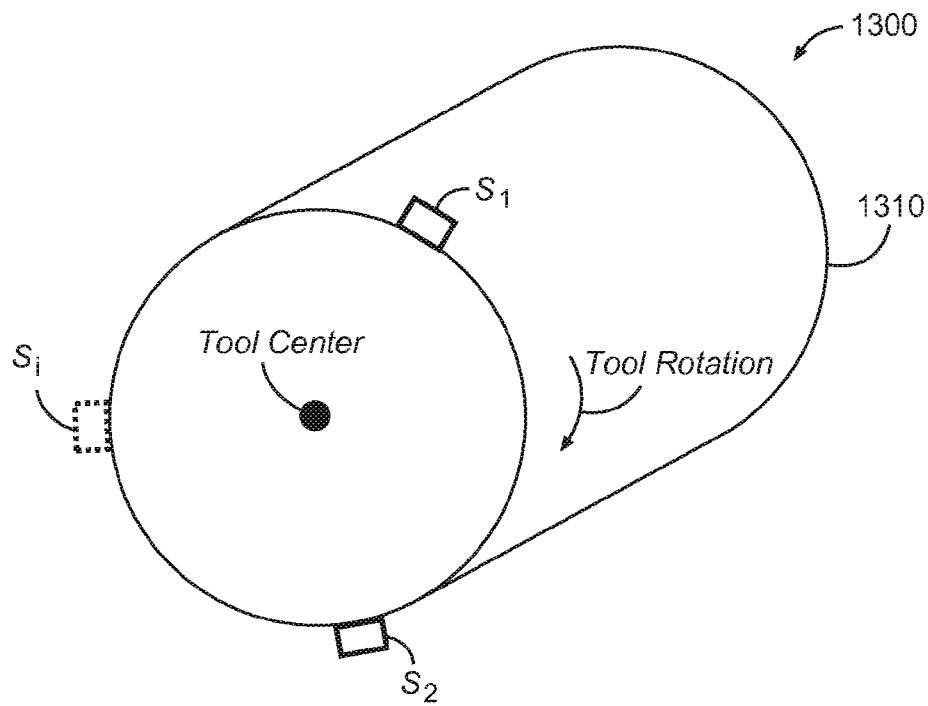
FIG. 13 illustrates an apparatus that can be used as part of methods and systems for various range determination embodiments.

FIG. 13 illustrates an apparatus 1300 that can be used as part of methods and systems for various range determination embodiments. Here a perspective view of one or more sensors S1, S2, ..., Si attached to a housing 1310, such as a down hole tool (e.g., a logging tool), is shown.

Thus, in some embodiments, multiple sensors S1, S2, ..., Si can be installed at different tool azimuthal angles for taking stationary azimuthal measurements, or a single sensor S1 can be utilized together with tool rotation operation to take multiple azimuthal measurements to enable the calculation herein. Separation distances may be set by rotating the sensor(s) by a minimum of 30 degrees, or 45 degrees, or 90 degrees, and adjusting the equation parameters accordingly, as will be appreciated by those of ordinary skill in the art, after reading this document. That is, one or more of the sensors S1, S2, ..., Si can be used to take multiple azimuthal measurements, while rotating the housing 1310 in the azimuthal direction by increments of 30, 45, or 90 degrees, or some other amount.

This solution helps reduce the effect of leakage current signals in the BHA by utilizing normal field to achieve ranging determination. The methods disclosed herein are useful for gradient field processing, for applications such as steam-assisted (SAGD), well avoidance, and well interception. The measured magnetic field at the ranging tool can result from current injected at the target well, or via backscatter radiation from the target well. While some of the above-described embodiments may show only one receiver, perhaps in the form of a magnetometer, coil, or telemetry receiver, one of ordinary skill in the art would realize that a drill string or downhole tool may include multiple receivers for making the various measurements described herein.

Additional Detailed Description and Some Representative Embodiments

Figure 14:
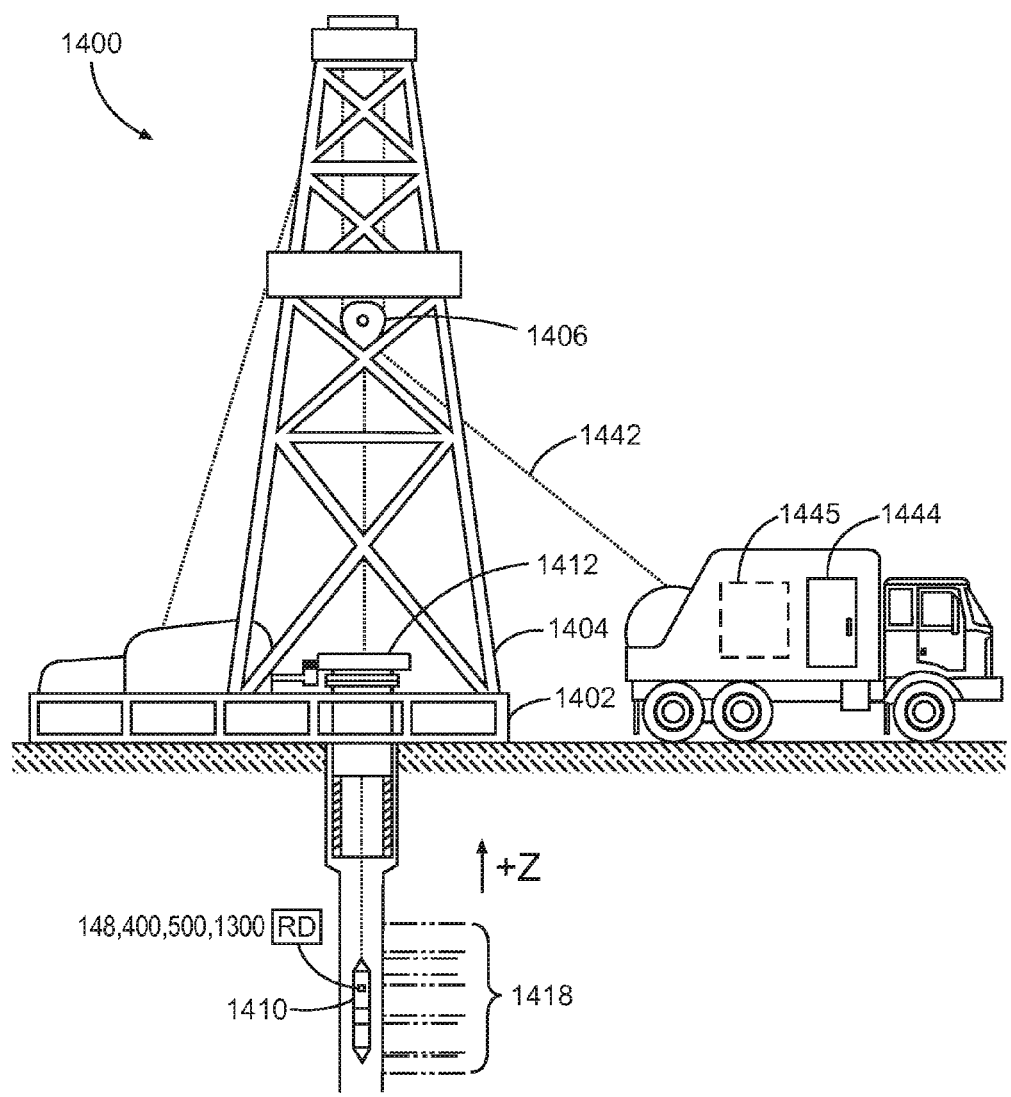
FIG. 14 is a block diagram of a wireline system implementation of various embodiments.

FIG. 14 is a block diagram of a wireline system 1400 implementation of various embodiments. The system 1400 of FIG. 14 may include any of the embodiments of receiver or sensor mounting discussed previously. In this case, a hoist 1406 may be included as a portion of a platform 1402, such as coupled to a derrick 1404, and used to raise or lower equipment such as a wireline sonde 1410 into or out of a borehole. The wireline sonde 1410 may include any one or more of the above-described embodiments, including sensors S1, S2, ..., Si and a range determination module RD.

In this wireline example, a cable 1442 may provide a communicative coupling between a logging facility 1444 (e.g., including a processor circuit 1445 including memory or other storage or control circuitry) and the sonde 1410. In this manner, information about the formation 1418 may be obtained. The processor circuit 1445 can be configured to access and execute instructions stored in a memory to implement any of the methods described herein (e.g., by accessing a range determination module RD).

Figure 15:
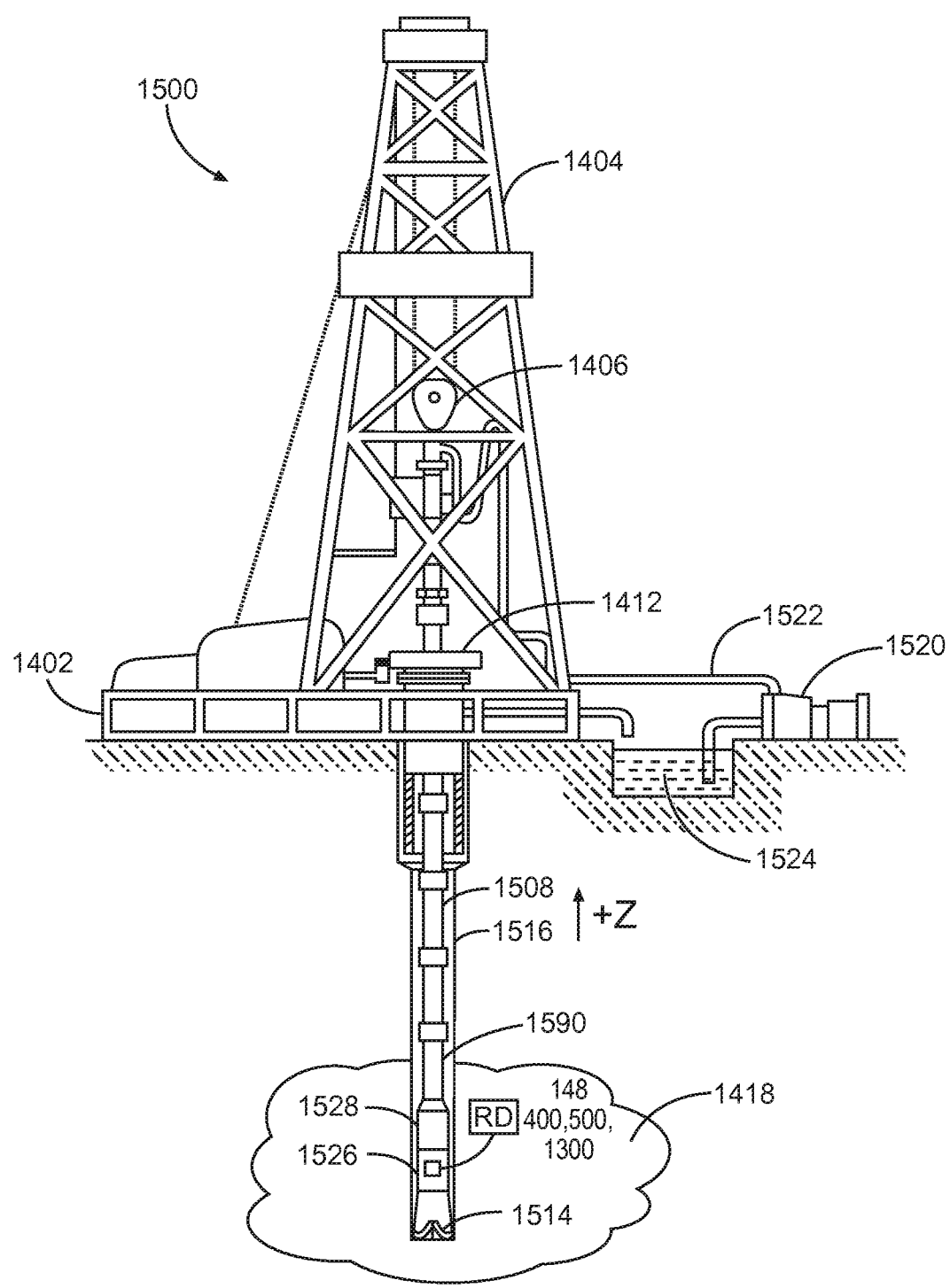
FIG. 15 is a block diagram of a drilling system implementation of various embodiments.

FIG. 15 is a block diagram of a drilling system 1500 implementation of various embodiments. This diagram shows a drilling rig system 1500 according to various embodiments that may include measurement while drilling (MWD) or LWD capability. The drilling apparatus can use data from an insert in the drill string 1508, having attached to a number of receivers or sensors as discussed previously, and using acquired and calculated ranging information to steer the drill bit 1514.

A drilling rig or platform 1402 generally includes a derrick 1404 or other supporting structure, such as including or coupled to a hoist 1406. The hoist 1406 may be used for raising or lowering equipment or other apparatus such as drill string 1508. The drill string 1508 may access a borehole 1516, such as through a well head 1512. The lower end of the drill string 1508 may include various apparatus, such as a drill bit 1514, such as to provide the borehole 1516.

A drilling fluid or "mud" may be circulated in the annular region around the drill bit 1514 or elsewhere, such as provided to the borehole 1516 through a supply pipe 1522, circulated by a pump 1520, and returning to the surface to be captured in a retention pit 1524 or sump. Various subs or tool assemblies may be located along the drill string 1508, such as a bottom hole assembly (BHA) 1526 or a second sub 1528. The BHA 1526 and/or the sub 1528 may include one or more sensors or receivers (e.g., including sensors S1, S2, ..., Si), as described herein, along with a current source (e.g., a power supply 148) to initiate a ranging signal, and a processor with access to a memory that contains a program to implement any of the methods described herein (e.g., a ranging determination module RD).

Thus, some of the embodiments described herein may be realized in part, as a set of instructions on a computer readable medium 142 comprising ROM, RAM, CD, DVD, hard drive, flash memory device, or any other computer readable medium, now known or unknown, that when executed causes a computing system, such as computer as illustrated in FIG. 1 or some other form of a data processing device 140, to implement portions of a method of the present disclosure, for example the methods described in FIG. 12 (e.g., for computer-assisted well completion).

Though described serially in the examples of FIG. 12, one of ordinary skill in the art would recognize that other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

It is expected that the system range and performance can be extended with the various embodiments described herein. Power can often be saved, and accuracy of ranging measurements improved. Signal components may be extracted and converted to pixel colors or intensities and displayed as a function of tool position and azimuth. Assuming the target casing string is within detection range, it may appear as a bright (or, if preferred, a dark) band in the image. The color or brightness of the band may indicate the distance to the casing string, and the position of the band indicates the direction to the casing string. Thus, by viewing such an image, a driller can determine in a very intuitive manner whether the new borehole is drifting from the desired course and he or she can quickly initiate corrective action. For example, if the band becomes dimmer, the driller can steer towards the casing string. Conversely, if the band increases in brightness, the driller can steer away from the casing string. If the band deviates from its desired position directly above or below the casing string, the driller can steer laterally to re-establish the desired directional relationship between the boreholes.

While the text of this document has been divided into sections, it should be understood that this has been done as a matter of convenience, and that the embodiments discussed in any one section may form a part of any or more embodiments described in another section, and vice-versa. Moreover, various embodiments described herein may be combined with each other, without limitation. Thus, many embodiments may be realized. Some of these will now be listed in a non-limiting fashion.

In some embodiments, an apparatus comprises a down hole tool housing attached to two sensors S1, S2 rotatable in an azimuthal plane, each of the sensors to measure an electromagnetic field strength component comprising at least a normal component. The apparatus may further comprise and a range determination module RD to receive the normal component as a first set of field strength components from each of the sensors provided by the sensors when the sensors are located at a first azimuthal location, and as a second set of field strength components from each of the sensors provided by the sensors when the sensors are located at a second azimuthal location different from the first azimuthal location, and to determine an approximate range R from the sensors disposed in one well, to another well, via direct transmission or backscatter transmission of an electromagnetic field from the other well.

In some embodiments, the sensors are rotatable by at least 30 degrees, or at least 45 degrees, or at least 90 degrees in the azimuthal plane. In some embodiments, the sensors comprise at least one of magnetometers or coil antennas. In some embodiments, the range determination module is attached to the down hole tool housing.

In some embodiments, a system comprises a current source (e.g., a power supply) to couple current to one of a target well or a drilling well; and an apparatus. The apparatus may comprise a range determination module RD to receive a normal component of an electromagnetic field strength measurement of the current as a first set of field strength components and a second set of field strength components from at least two pairs of sensors (S1, S2) and (S3, S4) provided by the sensors within the drilling well. The range determination module may further operation to determine an approximate range R from the sensors disposed in the drilling well, to the target well, via direct transmission from the target well, or via backscatter transmission from the target well.

In some embodiments, the apparatus comprises an insert, and at least one of the at least two pairs of sensors are attached to the insert. In some embodiments, the apparatus comprises a logging tool housing, and one of the at least two pairs of sensors comprises two sensors oriented approximately 180 degrees away from each other on each side of the logging tool housing. In some embodiments, the at least two pairs of sensors comprises two pairs of gradient sensors.

In some embodiments, a method comprises receiving normal components of electromagnetic field strength measurements within a first well as a first set of field strength components from at least one rotatable sensor provided by the sensor when the sensor is located at a first azimuthal location within the first well. Some embodiments of this method further comprise receiving the normal components of the electromagnetic field strength measurements as a second set of field strength components from the sensor provided by the sensor when the sensor has been rotated to be located at a second azimuthal location within the first well, wherein the first and second azimuthal locations are at approximately a same longitudinal location. Some embodiments of this method comprise determining an approximate range from the sensor disposed within the first well, to a second well that serves as a source of an electromagnetic field, via direct transmission or backscatter transmission.

In some embodiments, the approximate range R is calculated by determining the ranging angle $\theta$, using tangential and normal components located at the same tool azimuth angle, and then using the formula:

$$\frac{H}{\frac{\Delta H}{2\Delta S}} = -\frac{R^2 + \Delta S^2}{2R\cos\theta} = -\frac{R}{2\cos\theta}\left(1 + \left(\frac{\Delta S}{R}\right)^2\right)$$

where H is one of the normal components of the electromagnetic field strength measurements, $\Delta H$ is a difference between the first and second set of field strength components, and $\Delta S$ is a separation between the at least one rotatable sensor and a tool center.

In some embodiments of the method, the approximate range is calculated using the formula:

$$\sqrt{\frac{1}{\left(\frac{\Delta H}{2\Delta S}\right)^2 + \left(\frac{\Delta H}{2\Delta S}\right)^2}} =$$

$$\sqrt{\frac{1}{\frac{4\cos^2\theta}{R^2} + \frac{4\sin^2\theta}{R^2}}\left(1 + \left(\frac{\Delta S}{R}\right)^2\right)} = \frac{R}{2}\left(1 + \left(\frac{\Delta S}{R}\right)^2\right)$$

wherein H is one of the normal components of the electromagnetic field strength measurements, $\Delta H$ is a difference between the first and second set of field strength components, $\Delta S$ is a separation between the at least one rotatable sensor and a tool center, R is the approximate range, and $\theta$ is a ranging angle.

In some embodiments of the method, the at least one rotatable sensor comprises two pairs of sensors Pair1 and Pair2, and the approximate range is calculated using the formula:

$$\sqrt{\frac{1}{\left(\frac{\Delta H}{2\Delta S}\right)^2_{Pair1} + \left(\frac{\Delta H}{2\Delta S}\right)^2_{Pair2}}} =$$

$$\sqrt{\frac{1}{\frac{4\cos^2\theta}{R^2} + \frac{4\sin^2\theta}{R^2}}\left(1 + \left(\frac{\Delta S}{R}\right)^2\right)} = \frac{R}{2}\left(1 + \left(\frac{\Delta S}{R}\right)^2\right)$$

wherein H is one of the normal components of the electromagnetic field strength measurements, $\Delta H$ is a difference between the first and second set of field strength components, $\Delta S$ is a separation between one of the sensors and a tool center, R is the approximate range, and $\theta$ is a ranging angle.

In some embodiments, the method further comprises electrically coupling a current source to the second well to enable the direct transmission of the electromagnetic field from the second well.

In some embodiments, the method further comprises launching an electromagnetic wave from the first well to enable the backscatter transmission of the electromagnetic field from the second well.

In some embodiments, a method comprises receiving normal components of electromagnetic field strength measurements within a first well as a first set of field strength components from each of at least four sensors while the sensors remain relatively stationary within the first well. Some embodiments of this method comprise determining an approximate range from the sensors to a second well that serves as a source of an electromagnetic field, via direct transmission or backscatter transmission, using the normal components of the electromagnetic field strength measurements, without introducing sensor azimuthal separation into range calculations. In some embodiments, at least one of the at least four sensors comprises a gradient sensor.

In some embodiments of the method, the at least four sensors comprise two pairs of sensors Pair1 and Pair2, and the approximate range is calculated according to the $$\text{formula } \sqrt{\frac{1}{\left(\frac{\Delta H}{\frac{2\Delta S}{H}}\right)^2_{Pair1} + \left(\frac{\Delta H}{\frac{2\Delta S}{H}}\right)^2_{Pair2}}} = \frac{R}{2}\left(1 + \left(\frac{\Delta S}{R}\right)^2\right) \approx \frac{R}{2},$$

wherein H is one of the normal components of the electromagnetic field strength measurements, $\Delta H$ is a difference between the first and second set of field strength components, $\Delta S$ is a separation between one of the sensors and a tool center, and R is the approximate range.

In some embodiments, a method comprises receiving normal components of electromagnetic field strength azimuthal measurements within a first well at different tool azimuth angles in the first well. Some embodiments of this method further comprise determining an approximate range from the sensors to a second well that serves as a source of an electromagnetic field, via direct transmission or backscatter transmission, using the normal components of the electromagnetic field strength azimuthal measurements, without introducing sensor azimuthal separation into range calculations.

In some embodiments of the method, the azimuthal measurements are obtained from substantially stationary measurements at multiple sensors installed at different tool azimuth angles.

In some embodiments of the method, the azimuthal measurements are obtained from a single sensor taking multiple measurements at the different tool azimuthal angles obtained by rotating a tool housing to which the single sensor is attached.

In some embodiments of the method, the azimuthal measurements are obtained from a pair of sensors making a first set of the electromagnetic field strength azimuthal measurements at a first one of the different tool azimuthal angles, and from the pair of sensors making a second set of the electromagnetic field strength azimuthal measurements at a second one of the different tool azimuthal angles approximately 90 degrees away from the first one of the different tool azimuthal angles.

In some embodiments, an apparatus comprises a down hole tool housing attached to a set of sensors, the down hole tool housing comprising one or more of a wireline sonde, a bottom hole assembly, a drill collar, a drill string pipe, or a sub. Some embodiments of this apparatus further comprise a processor communicatively coupled to the set of sensors to receive electromagnetic signal strength signals from the sensors, and to a memory, the memory having a set of instructions which, when executed by the processor, cause the processor to implement any of the methods described herein.

In some embodiments, a system comprises a source of current or voltage to electrically couple to a well casing of a first well or to attach to a first down hole tool housing. Some embodiments of this system further comprise a drill string to be disposed in a second well and mechanically coupled to a second down hole tool housing, the second down hole tool housing attached to a set of sensors. Some embodiments of this system further comprise a processor communicatively coupled to the set of sensors to receive signals representing electromagnetic field strength from the sensors, in response to the source exciting the well casing directly to initiate direct signal transmission, or indirectly via backscatter transmission, the processor communicatively coupled to a memory having a set of instructions which, when executed by the processor, cause the processor to implement any of the methods described herein.

Numerous other variations and modifications will become apparent to those skilled in the art once the above disclosure is fully appreciated. For example, the foregoing discussion has focused on a logging while drilling implementation, but the disclosed techniques would also be suitable for wireline tool implementation (as shown in FIG. 14). It is intended that the following claims be interpreted to embrace all such variations and modifications.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of the knowledge provided by this disclosure. Thus, the present disclosure includes a variety of combinations and/or integrations of the embodiments and examples described herein, as well as further embodiments and examples, as defined within the scope of all claims based on this disclosure, as well as all legal equivalents of such claims.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. An apparatus, comprising:
    a down hole tool housing attached to at least two sensors rotatable in an azimuthal plane, each of the sensors to measure an electromagnetic field strength component comprising at least a normal component; and
    a range determination module to,
        receive a normal component as a first set of field strength components from each of the sensors provided by the sensors when the sensors are located at a first azimuthal location;
        receive a normal component as a second set of field strength components from each of the sensors provided by the sensors when the sensors are located at a second azimuthal location different from the first azimuthal location;

determine a gradient component based on the normal components received from the first and second azimuthal locations; and determine an approximate range based on the normal components and the gradient component from the sensors disposed in one well, to another well, via direct transmission or backscatter transmission of an electromagnetic field from the other well.

2. The apparatus of claim 1, wherein the two sensors are rotatable by at least 30 degrees, or at least 45 degrees, or at least 90 degrees in the azimuthal plane.

3. The apparatus of claim 1, wherein the two sensors comprise at least one of magnetometers or coil antennas.

4. The apparatus of claim 1, wherein the range determination module is attached to the down hole tool housing.

5. A system, comprising:
a current source to couple current to one of a target well or a drilling well; and
an apparatus comprising a range determination module that utilizes at least two pair of sensors to,
at a first azimuthal location, receive a normal component of an electromagnetic field strength measurement of the current as a first set of field strength components and, at a second azimuthal location, receive a normal component of an electromagnetic field strength measurement of the current as a second set of electromagnetic field strength components;
determine a gradient component based on the normal components received from the first and second azimuthal locations; and
determine an approximate range based on the normal components and the gradient component from the sensors disposed in the drilling well, to the target well, via direct transmission from the target well, or via backscatter transmission from the target well.

6. The system of claim 5, wherein the apparatus comprises an insert, and wherein at least one of the at least two pairs of sensors are attached to the insert.

7. The system of claim 5, wherein the apparatus comprises a logging tool housing, and wherein one of the at least two pairs of sensors comprises two sensors oriented approximately 180 degrees away from each other on each side of the logging tool housing.

8. The system of claim 5, wherein the at least two pairs of sensors comprises two pairs of gradient sensors.

9. A method, comprising:
receiving normal components of electromagnetic field strength measurements within a first well as a first set of field strength components from at least one rotatable sensor provided by the sensor when the sensor is located at a first azimuthal location within the first well;
receiving the normal components of the electromagnetic field strength measurements as a second set of field strength components from the sensor provided by the sensor when the sensor has been rotated to be located at a second azimuthal location within the first well, wherein the first and second azimuthal locations are at approximately a same longitudinal location;
determining a gradient component based on the normal components received at the first and second azimuthal locations; and
determining an approximate range, based on the normal components and the gradient component, from the sensor disposed within the first well, to a second well that serves as a source of an electromagnetic field, via direct transmission or backscatter transmission.

10. A method comprising:
receiving normal components of electromagnetic field strength measurements within a first well as a first set of field strength components from at least one rotatable sensor provided by the sensor when the sensor is located at a first azimuthal location within the first well;
receiving the normal components of the electromagnetic field strength measurements as a second set of field strength components from the sensor provided by the sensor when the sensor has been rotated to be located at a second azimuthal location within the first well, wherein the first and second azimuthal locations are at approximately a same longitudinal location; and
determining an approximate range, R, from the sensor disposed within the first well, to a second well that serves as a source of an electromagnetic field, via direct transmission or backscatter transmission, wherein the at least one rotatable sensor comprises two pairs of sensors Pair1 and Pair2, and wherein the approximate range, R, is calculated using the formula:

$$\sqrt{\frac{1}{\left(\frac{\Delta H}{\frac{2\Delta S}{H}}\right)^2_{Pair1} + \left(\frac{\Delta H}{\frac{2\Delta S}{H}}\right)^2_{Pair2}}} =$$

$$\sqrt{\frac{1}{\frac{4\cos^2\theta}{R^2} + \frac{4\sin^2\theta}{R^2}}\left(1 + \left(\frac{\Delta S}{R}\right)^2\right)} = \frac{R}{2}\left(1 + \left(\frac{\Delta S}{R}\right)^2\right)$$

wherein H is one of the normal components of the electromagnetic field strength measurements, ΔH is a difference between the first and second set of field strength components, ΔS is a separation between one of the sensors and a tool center, R is the approximate range, and θ is a ranging angle.

11. The method of claim 10, further comprising:
electrically coupling a current source to the second well to enable the direct transmission of the electromagnetic field from the second well.

12. The method of claim 10, further comprising:
launching an electromagnetic wave from the first well to enable the backscatter transmission of the electromagnetic field from the second well.

13. The apparatus of claim 1, wherein the approximate range, R, is calculated by determining a ranging angle θ, using the formula:

$$\frac{H}{\Delta H/2\Delta S} = -\frac{R^2 + \Delta S^2}{2R\cos\theta}\left(1 + \left(\frac{\Delta S}{R}\right)^2\right),$$

where H is one of the normal components of the electromagnetic field strength measurements, ΔH is a difference between the first and second set of field strength components, and ΔS is a separation between one of the two sensors and a center of a ranging tool on which the sensors are located.

14. A system, comprising:
a current source to couple current to one of a target well or a drilling well; and
an apparatus comprising a range determination module to receive a normal component of an electromagnetic field strength measurement of the current as a first set of field strength components and a second set of electromagnetic field strength components from at least two pairs of sensors Pair1 and Pair2 within the drilling well, and to determine an approximate range, R, from the sensors disposed in the drilling well, to the target well, via direct transmission from the target well, or via backscatter transmission from the target well, wherein R is calculated using the formula:

$$\sqrt{\frac{1}{\left(\frac{\Delta H}{H}\right)^2_{Pair1} + \left(\frac{\Delta H}{H}\right)^2_{Pair2}}} =$$

$$\sqrt{\frac{1}{\frac{4\cos^2\theta}{R^2} + \frac{4\sin^2\theta}{R^2}}\left(1+\left(\frac{\Delta S}{R}\right)^2\right)} = \frac{R}{2}\left(1+\left(\frac{\Delta S}{R}\right)^2\right)$$

wherein H is one of the normal components of the electromagnetic field strength measurements, ΔH is a difference between the first and second set of field strength components, ΔS is a separation between one of the sensors and a tool center, R is the approximate range, and θ is a ranging angle.

15. The method of claim 9, wherein the approximate range, R, is calculated by determining a ranging angle θ, using the formula:

$$\frac{H}{\Delta H/2\Delta S} = -\frac{R^2 + \Delta S^2}{2R\cos\theta}\left(1+\left(\frac{\Delta S}{R}\right)^2\right),$$

where H is one of the normal components of the electromagnetic field strength measurements, ΔH is a difference between the first and second set of field strength components, and ΔS is a separation between the sensor and a center of a ranging tool on which the sensor is located.

* * * * *